United States Patent [19]
Begun et al.

[11] Patent Number: 5,375,084
[45] Date of Patent: Dec. 20, 1994

[54] SELECTABLE INTERFACE BETWEEN MEMORY CONTROLLER AND MEMORY SIMMS

[75] Inventors: Ralph M. Begun, Raleigh, N.C.; Christopher M. Herring; Mark W. Kellogg, both of Essex Junction, Vt.

[73] Assignee: International Business Machines Corporation, Armonk, N.Y.

[21] Appl. No.: 148,955

[22] Filed: Nov. 8, 1993

[51] Int. Cl.$^5$ .................................................. G11C 5/04
[52] U.S. Cl. ........................................... 365/63; 365/51
[58] Field of Search ................................. 365/63, 51

[56] References Cited

U.S. PATENT DOCUMENTS

| | | | |
|---|---|---|---|
| 4,797,850 | 1/1989 | Amitai | 364/900 |
| 5,157,384 | 10/1992 | Greanias et al. | 340/706 |
| 5,212,666 | 5/1993 | Takeda | 365/63 X |
| 5,270,964 | 12/1993 | Bechtolsheim et al. | 365/63 X |
| 5,272,664 | 12/1993 | Alexander et al. | 365/63 X |

FOREIGN PATENT DOCUMENTS 479428 4/1992 European Pat. Off.
WO9314455 7/1993 WIPO.

OTHER PUBLICATIONS

IBM Docket Dossier dated Jan. 10, 1990 re their ref. No. BC9-90-044 regarding invention entitled "Data Processing Apparatus for Dynamically Setting Timing in a Dynamic Memory System".
IBM Technical Disclosure Bulletin, vol. 34, No. 10B, dated Mar., 1992 (pp. 91–94).

Primary Examiner—Do Hyun Yoo
Attorney, Agent, or Firm—Calfee, Halter & Griswold

[57] ABSTRACT

A computer system is provided which includes a CPU having a memory controller interconnecting the CPU to a bus. The bus has card receptacles having pin receiving sockets electrically connected to the bus to receive the pins of memory cards. The memory controller is connected to logic which will identify the type of memory card which is inserted in the pin sockets. From this identification combinational logic is provided that, in response to the identification of the type of card, will direct the appropriate signals from the memory controller to the appropriate sockets depending upon which type of card is plugged into the socket. In this way, a given socket configuration can accept different types of memory cards having different pin signal configurations without physical modification of the sockets.

7 Claims, 2 Drawing Sheets

SELECTABLE INTERFACE BETWEEN MEMORY CONTROLLER AND MEMORY SIMMS

FIELD OF THE INVENTION

This invention relates generally to add-on memory systems for personal computers, and more particularly to a system and method for utilizing various types of add-on memory in a PC having a CPU which allows the CPU to utilize various types of memory cards without physically reconfiguring the CPU for each type of memory card.

BACKGROUND ART

Personal computer systems are well known in the art. Personal computer systems in general, and IBM Personal Computers in particular, have attained widespread use for providing computer power to many segments of today's modern society. Personal computers can typically be defined as a desktop, floor-standing, or portable microcomputer that is comprised of a system unit having a single central processing unit (CPU) and associated volatile and non-volatile memory, including all RAM and BIOS ROE, a system monitor, a keyboard, one or more flexible diskette drives, a fixed disk storage device, and an optional printer. One of the distinguishing characteristics of these systems is the use of a motherboard or system planar to electrically connect these components together. These systems are designed primarily to give independent computing power to a single user and are inexpensively priced for purchase by individuals or small business. Examples of such personal computer systems are IBM's PERSONAL COMPUTER AT and IBM's PERSONAL SYSTEM/2.

In computer systems, the components communicate via electrical signals. These electrical signals are typically carried by electrical connections between the system components. Typical types of electrical connections include metal traces on a printed circuit board, vias, plated through holes, plugs, and individual wires wrapped from pin to pin of system components. Typically groups of electrical signals and groups of electrical connections that carry the electrical signals are referred to as a "bus." Thus, a reference to a "bus" can indicate a reference to a group of electrical signals, a group of electrical connections that carry the electrical signals, or a reference to both a group of electrical signals that form a protocol and a group of electrical connections that carry the electrical signals. Systems can be said to have a variety of buses. A "local bus" is a bus that is, in general, synchronous with the CPU and designed to optimize the performance of the CPU. Most systems also have a "peripheral bus," which is either synchronous or asynchronous, and may transfer data at a slower frequency than the local bus. Peripheral buses typically have a number of interface slots, which are connectors that allow peripheral device cards to be pluggably connected to the peripheral bus. Typically the peripheral bus is interfaced to the system local bus with a bus interface circuit (BIC). The BIC interfaces between the system local bus and the peripheral bus, handling any differences in bus bandwidths, managing control of the buses between busmasters, etc.

Personal computer systems are typically used to execute software to perform such diverse activities as word processing, manipulation of data via spread-sheets, collection and relation of data in databases, displays of graphics, design of electrical or mechanical systems using system design software, etc.

Most personal computer systems employ dynamic random access memory (DRAM) for main storage. DRAM memory is fabricated on silicon chips of various sizes. Most personal computers require many (e.g., 4–128 or more) of these silicon chips to provide a full main memory array of the desired size. Moreover, it is convenient to assemble multiple DRAM chips onto small card sub-assemblies and then employ these sub-assemblies in a personal computer system.

In the past, memory solutions for most low cost personal computers utilized only one of two possible memory packaging solutions, i.e., 30-pin (1 Byte) or 72-pin (4 Byte) Single Inline Memory Modules (SIMM). While other more sophisticated solutions are in existence, they were used in a small percentage of the systems produced. The solution for memory packaging these products was reasonably straightforward with the 30-pin SIMM, as the 30-pin standard was quite narrow in scope. However, this has changed with the increasing complexity of the 72-pin SIMM with various types of options on the 72-pin SIMM, as well as the proliferation of more advanced SIMMs, e.g., 88-pin SIMMs and 168-pin SIMMs. In fact, within these different size SIMMs, there has developed several different standards such as industry standard as opposed to IBM standard, and additionally some of these SIMMs were ECC SIMMs, i.e., they were error correction code (ECC) optimized; i.e., they were designed with 36 or 40 data bits and no byte write capability.

However, other problems arise, especially with respect to ECC versus parity SIMMs. For example, several particular pins are used for one particular signal on 72-pin parity SIMMs, and are used for another signal on 72-pin ECC SIMMs. Thus, the signals being delivered from the CPU by the memory controller if used for one configuration will not work for the other. In the past, it was necessary to either limit the type of SIMMs that can be added on, or the planar had to be rewired for each particular type of SIMM, and thus a given system could only use a particular SIMM depending upon how it was hard wired. This presented a problem for adaptability or flexibility for a given system design to use multiple different types of SIMM memory cards.

SUMMARY OF THE INVENTION

According to the present invention, a personal computer system is provided which includes a CPU having a memory controller interconnecting the CPU to a bus, wherein a plurality of card receptacles are provided having pin receiving sockets electrically connected to the bus to receive the pins of at least one memory card having a plurality of pins. The memory controller is connected to logic which will identify the type of memory card which is inserted in the pin sockets and from this identification provide combinational logic that, in response to the identification of the type of card, will direct the appropriate signals from the memory controller to the appropriate pins depending upon which type of card is plugged into the socket. In this way, a given socket configuration can accept different types of memory cards having different pin signal configurations without physical modification of the sockets or the memory controller, or the system.

DESCRIPTION OF THE PREFERRED EMBODIMENT(S)

Figure 1:
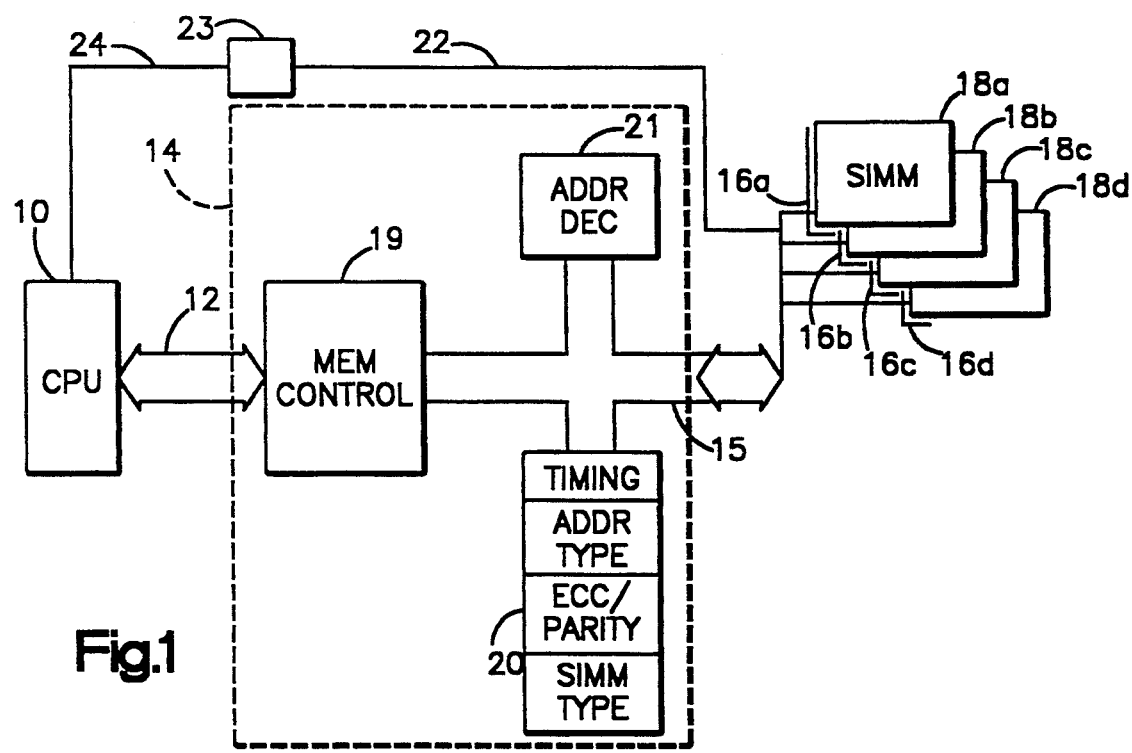
FIG. 1 is a high level block diagram of the interconnection between the CPU, the memory controller and the SIMM sockets of the present invention.

Referring now to the drawings and for the present FIG. 1, a high level diagram of the present invention as embodied in a computer system, including a CPU, is shown. As indicated above, the present invention is directed specifically to the family of personal computers which has a CPU and add-on memory cards available, the access to the memory cards being controlled by a memory controller and which computer has programing to allow access to add-on memory cards which have various configurations, e.g., different pin numbers and different standards which require different memory actuation signals such as ECC SIMMs, as well as standard parity SIMMs. The system will be described using 72-pin industry standard SIMMs, and showing how both parity and ECC SIMMs can be used in the same socket.

As can be seen in FIG. 1, the computer system includes a CPU 10 which includes a local bus 12 connected to a memory controller 14. Memory controller 14 is connected by an expansion bus 15 to a plurality of sockets 16a through 16d, each adapted to receive a memory card, the memory cards being designated 18a through 18d. In the described embodiment, the cards are 72-pin ECC or parity industry standard SIMMs. The SIMMs are shown as being arranged in a group of four, although more or less cards can be accommodated to form the system memory. The memory controller 14 includes generic core memory control logic 19, a bank information table 20, and an address decoder 21. A line 22 connects the sockets 16a–16d to SIMM defining logic 23 which in turn is connected by line 24 to the CPU 10. This is conventional prior art structure and allows the CPU to be programmed with information relating to the type of SIMMs selected.

Figure 2:
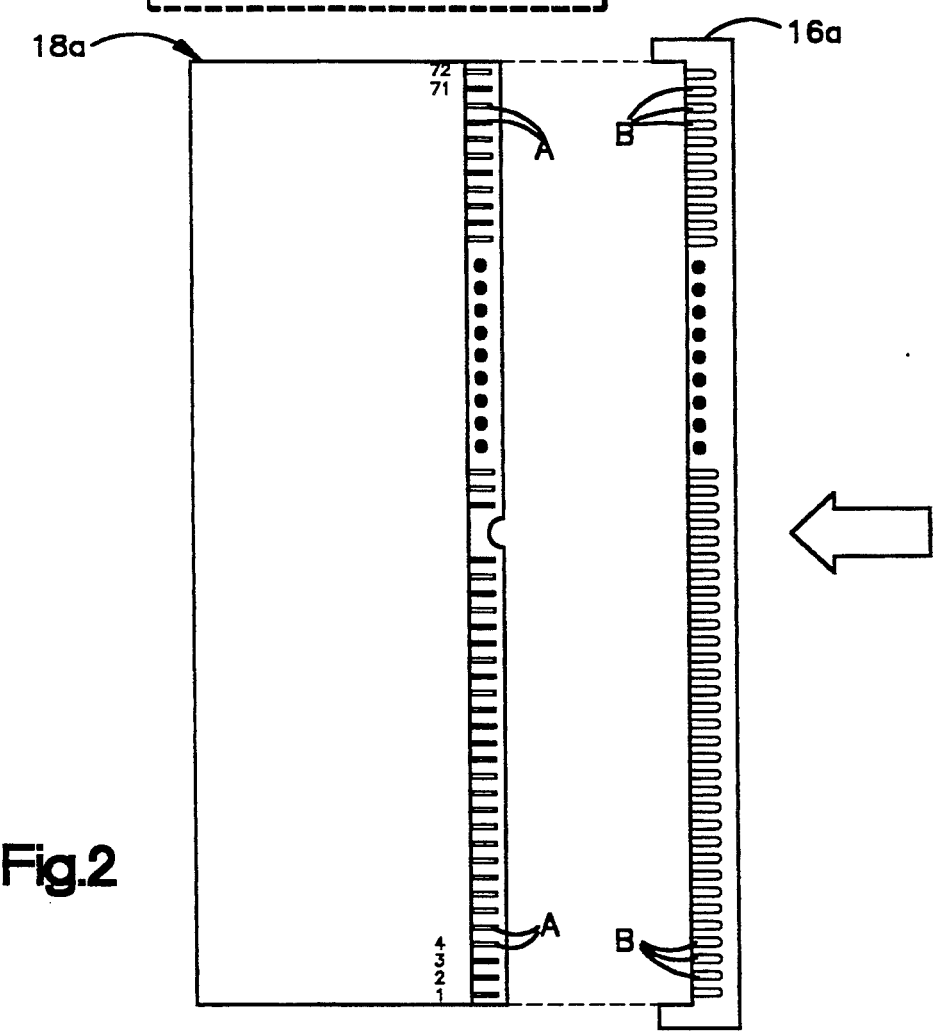
FIG. 2 is a somewhat diagrammatic view showing the pin configuration of a 72-pin SIMM and socket for receiving the SIMM.

FIG. 2 depicts, somewhat diagrammatically, the connection of a 72-pin SIMM 18a into a socket 16a formed on the bus 15. The various pins are shown and designated by the reference character A. The pins mate with corresponding electrical connections B in the sockets 16a. This is a conventional card and socket configuration.

In order for the CPU to operate with different types of cards, it is necessary to do two things. First, it is necessary to determine which type of cards are present, e.g., 72 pin, 68 pin, 88 pin, etc., and whether the assembly is ECC or parity. Once this determination has been made, it is necessary to provide the necessary memory actuation signals to access the memory through the pins on the card. Through the use of lines 22, 24 and logic 23, and presence detect pins (which on industry standard SIMMs or pins number 67–70, the memory controller 14 is programmed with the SIMM type information which is conventional practice. The pin number is used herein to denote the specific pin using the standard pin numbering system of industry standard SIMMs.

The address decoder 21 can function using either one of two techniques. One technique is to compare the starting and ending address regions in preprogrammed registers with the input address in question; alternatively, a preprogrammable look-up with the input address as a pointer to the table can be used. This is the input to the address decoder, with the output from the address decoder 21 to the bank information table 20.

When table 20 has been apprised of the address, and hence the type of card or cards being used, it will provide an output to the logic 19 which will provide the signal timing information to this type of SIMM. This is conventional prior art technique.

However, merely adjusting the timing and other parameters to accommodate a particular type of SIMM card will not in and of itself allow various SIMMs to be inserted in a given set of sockets. The reason for this is that with various different types of SIMMs the pins may have, and in fact do have in most cases, different "pin-out" configurations; i.e. a particular I/O signal on certain pins for a 72-pin ECC SIMM will be different than the I/O signals on the same pins for a 72-pin parity SIMM. This difference is compounded when it is realized that there are many different types of cards all with different pin-out configurations. Some of these types of cards are as follows: (a) 72-pin industry standard parity SIMM; (b) 72-pin industry standard ECC SIMM; (c) 88-pin IC DRAM cards (parity with buffered inputs); (d) 88-pin IC DRAM cards (ECC with buffered inputs); (e) 168-pin 8-Byte parity SIMMs (with buffered inputs); and (f) 168-pin 8-Byte ECC SIMMs (with buffered inputs). Each of these cards will have a different I/O configuration on certain of its pins. Therefore, the memory controller 14 needs to not only have the proper signal timing, but arrangements must be made so that, depending upon which type of memory card is inserted, the proper signals with the proper actuation control sequence will be supplied to the appropriate pins.

This is accomplished by a logic circuit contained within the memory controller 14. Used as an example here is the pin-out or I/O signal configuration of the 72-pin industry standard ECC SIMM as compared with the 72-pin industry standard parity SIMM, each of which SIMMS have the same pin geometry, but different signal configuration for some of the pins. The signal configurations for the 72-pins are shown for the parity SIMMs in Table I, and for the ECC SIMMs in Table II.

TABLE I

| PIN | SYMBOL |
| --- | --- |
| 1 | GND |
| 2 | $DQ_0$ |
| 3 | $DQ_{18}$ |
| 4 | $DQ_1$ |
| 5 | $DQ_{19}$ |
| 6 | $DQ_2$ |
| 7 | $DQ_{20}$ |
| 8 | $DQ_3$ |
| 9 | $DQ_{21}$ |
| 10 | $V_{cc}$ |
| 11 | NC |
| 12 | $A_0$ |
| 13 | $A_1$ |
| 14 | $A_2$ |
| 15 | $A_3$ |
| 16 | $A_4$ |
| 17 | $A_5$ |
| 18 | $A_6$ |

TABLE I-continued

| | |
|---|---|
| 19 | $A_{10}$ |
| 20 | $DQ_4$ |
| 21 | $DQ_{22}$ |
| 22 | $DQ_5$ |
| 23 | $DQ_{23}$ |
| 24 | $DQ_6$ |
| 25 | $DQ_{24}$ |
| 26 | $DQ_7$ |
| 27 | $DQ_{25}$ |
| 28 | $A_7$ |
| 29 | NC |
| 30 | $V_{cc}$ |
| 31 | $A_8$ |
| 32 | $A_9$ |
| 33 | $RAS_3$ |
| 34 | $RAS_2$ |
| 35 | $DQ_{26}$ |
| 36 | $DQ_8$ |
| 37 | $DQ_{17}$ |
| 38 | $DQ_{35}$ |
| 39 | GND |
| 40 | $CAS_0$ |
| 41 | $CAS_2$ |
| 42 | $CAS_3$ |
| 43 | $CAS_1$ |
| 44 | $RAS_0$ |
| 45 | $RAS_1$ |
| 46 | NC |
| 47 | WE |
| 48 | NC |
| 49 | $DQ_9$ |
| 50 | $DQ_{27}$ |
| 51 | $DQ_{10}$ |
| 52 | $DQ_{28}$ |
| 53 | $DQ_{11}$ |
| 54 | $DQ_{29}$ |
| 55 | $DQ_{12}$ |
| 56 | $DQ_{30}$ |
| 57 | $DQ_{13}$ |
| 58 | $DQ_{31}$ |
| 59 | $V_{cc}$ |
| 60 | $DQ_{32}$ |
| 61 | $DQ_{14}$ |
| 62 | $DQ_{33}$ |
| 63 | $DQ_{15}$ |
| 64 | $DQ_{34}$ |
| 65 | $DQ_{16}$ |
| 66 | NC |
| 67 | Note 1 |
| 68 | Note 1 |
| 69 | Note 1 |
| 70 | Note 1 |
| 71 | NC |
| 72 | GND |

| | DENSITY | | | | | |
|---|---|---|---|---|---|---|
| | 1 MB | 2 MB | 4 MB | 8 MB | 16 MB | 32 MB |
| 67 | GND | NC | GND | NC | GND | NC |
| 68 | NC | GND | GND | NC | NC | GND |

| | SPEED | | | |
|---|---|---|---|---|
| PINS | 60 ns | 70 ns | 80 ns | 100 ns |
| 69 | NC | GND | NC | GND |
| 70 | NC | NC | GND | GND |

Note 1: Pins 67–70 define SIMM density and speed.

TABLE II

| PIN | SYMBOL |
|---|---|
| 1 | GND |
| 2 | $DQ_0$ |
| 3 | $DQ_1$ |
| 4 | $DQ_2$ |
| 5 | $DQ_3$ |
| 6 | $DQ_4$ |
| 7 | $DQ_5$ |
| 8 | $DQ_6$ |
| 9 | $DQ_7$ |
| 10 | $V_{cc}$ |
| 11 | $PO_5$ |
| 12 | $A_0$ |

TABLE II-continued

| | |
|---|---|
| 13 | $A_1$ |
| 14 | $A_2$ |
| 15 | $A_3$ |
| 16 | $A_4$ |
| 17 | $A_5$ |
| 18 | $A_6$ |
| 19 | OE |
| 20 | $DQ_8$ |
| 21 | $DQ_9$ |
| 22 | $DQ_{10}$ |
| 23 | $DQ_{11}$ |
| 24 | $DQ_{12}$ |
| 25 | $DQ_{13}$ |
| 26 | $DQ_{14}$ |
| 27 | $DQ_{15}$ |
| 28 | $A_7$ |
| 29 | $DQ_{16}$ |
| 30 | $V_{cc}$ |
| 31 | $A_8$ |
| 32 | $A_9$ |
| 33 | NC |
| 34 | NC |
| 35 | $DQ_{17}$ |
| 36 | $DQ_{18}$ |
| 37 | $DQ_{19}$ |
| 38 | $DQ_{20}$ |
| 39 | GND |
| 40 | $CAS_0$ |
| 41 | $A_{10}$ |
| 42 | $A_{11}$ |
| 43 | $CAS_1$ |
| 44 | $RAS_0$ |
| 45 | $RAS_1$ |
| 46 | $DQ_{21}$ |
| 47 | WE |
| 48 | GND |
| 49 | $DQ_{22}$ |
| 50 | $DQ_{23}$ |
| 51 | $DQ_{24}$ |
| 52 | $DQ_{25}$ |
| 53 | $DQ_{26}$ |
| 54 | $DQ_{27}$ |
| 55 | $DQ_{28}$ |
| 56 | $DQ_{29}$ |
| 57 | $DQ_{30}$ |
| 58 | $DQ_{31}$ |
| 59 | $V_{cc}$ |
| 60 | $DQ_{32}$ |
| 61 | $DQ_{33}$ |
| 62 | $DQ_{34}$ |
| 63 | $DQ_{35}$ |
| 64 | $DQ_{36}$ |
| 65 | $DQ_{37}$ |
| 66 | $DQ_{38}$ |
| 67 | Note 1 |
| 68 | Note 1 |
| 69 | Note 1 |
| 70 | Note 1 |
| 71 | $DQ_{39}$ |
| 72 | GND |

| | DENSITY | | | | | |
|---|---|---|---|---|---|---|
| | 1 MB | 2 MB | 4 MB | 8 MB | 16 MB | 32 MB |
| 67 | GND | NC | GND | NC | GND | NC |
| 68 | NC | GND | GND | NC | NC | GND |

| | SPEED | | | |
|---|---|---|---|---|
| PINS | 60 ns | 70 ns | 80 ns | 100 ns |
| 69 | NC | GND | NC | GND |
| 70 | NC | NC | GND | GND |

Note 1: Pins 67–70 define SIMM density and speed.

As can be seen, a majority of the pins utilize the same I/O signal on the same pin. However, in a significant number of cases, different signals are used on different pins. For example, pin 19 on the parity SIMM has the A10 signal and on the ECC SIMM has the output enable signal; pin 41 on the parity SIMM has the CAS2 signal, whereas on the ECC SIMM it is the A10 signal; and pin 42 on the parity SIMM has the CAS3 signal, whereas on the ECC SIPS4 it is the A11 signal. Thus, it is necessary to properly provide for these different configurations depending upon which SIMM is inserted. To this end, the memory control logic includes logic to select the necessary pin configuration depending upon the SIMM inserted.

Figure 3:
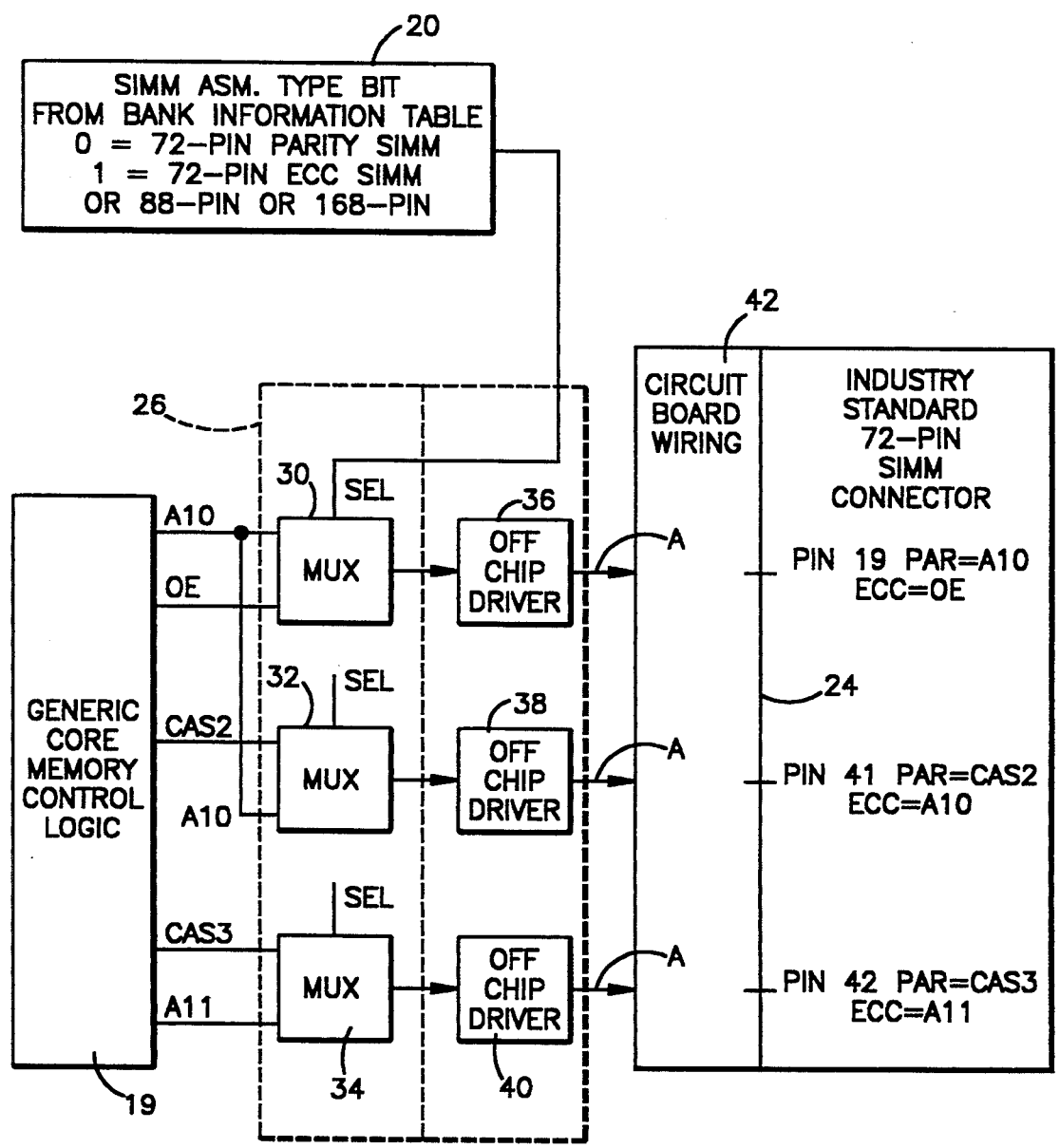
FIG. 3 is the memory select logic for 72-pin SIMMs to select the proper pin configuration between parity and ECC SIMM for three different pins.

This logic selection is shown in FIG. 3, it being understood that similar logic can be used for the other pins where different I/O signals are to be used. The logic includes three multiplexors 30, 32 and 34, connected respectively to off-chip drivers 36, 38 and 40. As input to the multiplexor 30 are the A10 and the output enable (OE) signals as input to the multiplexor 32 are the CAS2 and A10 signals, and as input to the multiplexor 34 are CAS3 and A11 signals. These signals are all supplied by the memory controller 14 to generate the various signals to the respective pins. A signal which defines the type of SIMM is received from the bank information table 20, which in turn has received a signal from the address decoder 21 as to the type of SIMM, i.e., ECC or parity.

The multiplexors 30, 32 and 34 each have a select line which determines the type of pin. For example, in the present embodiment, a "0" indicates a 72-pin parity SIMM, while a "1" indicates a 72-pin ECC SIMM. The various signals inputted to the multiplexors 30, 32 and 34, together with the chip select also inputted to the multiplexor 34, provides an output signal to the off-chip drivers 36, 38 and 40 which, depending upon the chip select, the chip driver 36 will at pin 19 provide either an A10 or an output enable signal, at pin 41 provide either a CAS2 or an A10 signal, and at pin 42 provide either a CAS3 or an A11 signal. Other pins having different functions can be similarly driven.

Thus, it can be seen that with any given socket-pin configuration wherein the pins may have different I/O signals depending upon the type of card, e.g., parity SIMMs and ECC SIMMs, the logic on the memory controller chip will provide the necessary I/O signals to the required pins once the SIMM type has been determined by the logic contained within the CPU, and the internal logic within the memory controller and CPU will be modified to perform the various I/O signal functions required. This allows a single CPU and memory controller system to be utilized with different SIMM socket configurations, and even within the same socket configuration with different pin I/O configurations without the necessity of any external glue logic or any logic external to the controller and CPU.

While one embodiment of this invention has been shown and described, various adaptations and modifications can be made without departing from the scope of the invention as defined in the appended claims.

What is claimed:

1. A computer system comprising a CPU, including a device to generate electrical signal, a bus, a memory controller connected to said bus and said CPU, a plurality of pin accessing sockets electrically connected to said bus to receive at least one memory card having a plurality of pins with a given pin geometry, and wherein said at least one memory card is selected from at least two different types of cards having the same pin geometry and wherein a plurality of pins at a given location of each of said two different cards are configured to receive different memory actuation signals from said memory controller, said memory controller including a logic circuit having identification logic responsive to a signal from said at least one card to identify which of said at least two different types of cards is inserted in said pin accessing sockets; and system combinational logic responsive to said identification logic and said memory controller to direct a plurality of appropriate signals from the memory controller to a plurality of appropriate pin accessing sockets depending on which of said at least two different cards is plugged into the pin accessing sockets; whereby a given pin accessing socket can use different types of memory cards having different pin signal configurations without physical modification of the pin accessing socket or memory controller, or the system.

2. The computer system as defined in claim 1 wherein said at least one memory card of said two different cards is a parity SIMM and the other is an ECC SIMM.

3. The computer system as defined in claim 2 wherein a plurality of pins on the ECC SIMM have a different signal configuration than corresponding pins of said plurality of pins on the parity SIMM.

4. The computer system as defined in claim 1 wherein said combinational logic is included at least in part in said memory controller.

5. A method of utilizing first and second types of memory SIMMs having a plurality of pins with a same pin geometry but different operating signals on at least one of said plurality of pins, and which SIMMs are connected to a computer system having a CPU, including a device to generate electrical signals, a bus, a memory controller connecting said bus and said CPU, a plurality of pin accessing sockets electrically connected to said bus to receive said plurality of pins of each of said first and second memory SIMMs and said plurality of pins corresponding to the pin access sockets, said method comprising the steps of: providing an identification signal from a SIMM inserted in at least one of said plurality of pin access sockets to identify which of said first and second types of memory SIMMs is inserted in said at least one of said plurality of pin access sockets; directing appropriate signals from the memory controller to at least one of a plurality of appropriate pin accessing sockets responsive to the first and second types of memory SIMMS which is connected to the at least one of said plurality of pin access sockets; whereby a given pin accessing socket can use different types of memory cards having different pin signal configurations without physical modification of the pin accessing socket or memory controller, or the system.

6. The method as defined in claim 5 wherein there are a plurality of pins having different operating signals between said first and second types of memory SIMMs.

7. The method as defined in claim 6, wherein said first type of memory SIMM is one selected from a group consisting of a parity SIMM and an ECC SIMM and said second type of memory SIMM is one selected from a group consisting of a parity SIMM and an ECC SIMM.

* * * * *